United States Patent [19]

Miller et al.

[11] Patent Number: 5,552,495

[45] Date of Patent: Sep. 3, 1996

[54] WATER-DISPERSIBLE ADHESIVE BLEND COMPOSITION

[75] Inventors: Richard A. Miller; Theron E. Parsons, III; Mark A. Montgomery, all of Kingsport, Tenn.

[73] Assignee: Eastman Chemical Company, Kingsport, Tenn.

[21] Appl. No.: 551,050

[22] Filed: Oct. 31, 1995

Related U.S. Application Data

[60] Division of Ser. No. 283,011, Jul. 29, 1994, which is a continuation-in-part of Ser. No. 175,330, Dec. 29, 1993.

[51] Int. Cl.$^6$ .................... C08F 20/00; C08G 63/68
[52] U.S. Cl. .................... 525/437; 525/444; 528/277; 528/279; 528/288; 528/291; 528/293; 528/295
[58] Field of Search .................................. 525/437, 444; 528/279, 288, 291, 293, 295, 277

[56] References Cited

U.S. PATENT DOCUMENTS

| | | |
|---|---|---|
| 2,769,804 | 11/1956 | Hanson . |
| 2,971,939 | 2/1961 | Baer . |
| 2,989,517 | 6/1961 | Hanson et al. . |
| 3,701,760 | 10/1972 | Hagemeyer et al. . |
| 3,734,874 | 5/1973 | Kibler . |
| 3,779,993 | 12/1973 | Kibler . |
| 3,850,858 | 11/1974 | Park . |
| 3,919,176 | 11/1975 | Meyer . |
| 4,052,368 | 10/1977 | Larson . |
| 4,070,316 | 1/1978 | Combs et al. . |
| 4,127,619 | 11/1978 | Godfrey . |
| 4,146,521 | 3/1979 | Godfrey . |
| 4,233,196 | 11/1980 | Sublett . |
| 4,304,901 | 12/1981 | O'Neill .................... 528/290 |
| 4,335,220 | 6/1982 | Coney .................... 523/414 |
| 4,460,728 | 7/1984 | Schmidt et al. .................... 524/271 |
| 4,471,086 | 9/1984 | Foster .................... 524/489 |
| 4,886,853 | 12/1989 | Foster .................... 524/477 |
| 5,098,962 | 3/1992 | Bozich .................... 525/437 |
| 5,218,042 | 6/1993 | Kuo et al. .................... 524/601 |

FOREIGN PATENT DOCUMENTS 0507244  10/1992  European Pat. Off. .

*Primary Examiner*—Nathan M. Nutter
*Assistant Examiner*—John M. Cooney, Jr.
*Attorney, Agent, or Firm*—Mark A. Montgomery; Harry J. Gwinnell

[57] ABSTRACT

Disclosed is a water-dissipatable or dispersible adhesive composition that is useful in forming paper articles and other products that can be recycled through repulping in both neutral and alkaline media. The water-dispersible adhesive composition is preferably a hot melt adhesive that is a low molecular weight, branched copolyester containing a sulfomonomer. Additional utility for the invention resides in the manufacture of recyclable articles where insolubility in body fluids combined with solubility in tap water are required.

6 Claims, No Drawings

WATER-DISPERSIBLE ADHESIVE BLEND COMPOSITION

This is a divisional application of copending application Ser. No. 08/283,011, filed Jul. 29, 1994 which is a continuation-in-part of Ser. No. 08/175,330 filed Dec. 29, 1993 now abandoned.

FIELD OF THE INVENTION

The present invention is directed to a water-dispersible adhesive composition. More particularly, the present invention is directed to a hot melt adhesive composition that, due to its water-dispersibility, is repulpable, allowing paper products, nonwoven assemblies, and other disposable products to be more effectively recycled. The present invention is also directed to a hot melt adhesive composition containing polyester that is water dispersible while maintaining excellent adhesive properties.

BACKGROUND OF THE INVENTION

Many adhesives including hot melt adhesives are useful for bonding various substrates together such as wood, paper, plastics, and textiles, as well as other materials. One use for which hot melt adhesives are well suited is the fabrication of corrugated paper board. Hot melt adhesives, useful for producing corrugated paper board, must have high bond strength under conditions of shock, stress, high humidity, and extremes of temperature encountered in transportation and storage. In addition, the melt point, wetting time, initial tack, setting time, pot life, and general handling qualities on automatic corrugated board machinery are essential considerations.

At present, it is very desirable to recycle paper, paper products, and other disposable products to conserve material resources and to avoid large additions to landfill space. It is thus a general practice in the paper industry to recover the used and waste corrugated material and repulp the material for use in the preparation of other materials such as cardboard. The use of polyolefin hot melt adhesives to close or seal cartons made from corrugated material has presented problems in regard to repulpability of the used boxes or cartons (see U.S. Pat. Nos. 4,070,316; 4,127,619; 4,146,521; 4,460,728; 4,471,086; and 4,886,853). In fact, all the presently available hot melt and pressure sensitive adhesives are largely water insoluble and very difficult to disperse during the repulping process. This fact makes certain paper products, in which adhesives are necessarily utilized, unattractive since failure to disperse the insoluble adhesives results in lower quality recycled paper having variable composition and nonuniformity and thus, lower product value.

One approach to avoid the presence of insoluble adhesives in the recycled paper products is to use adhesives whose density is different from the density of water and pulp in water, thus permitting gravitational separation. However, this requires separation steps which can increase the recycling costs of the paper products containing adhesives.

Another approach could be to use a water soluble adhesive that would be separated from the pulp and dispersed into the water during repulping. This type of adhesive would remain in the water when the pulp is recovered. However, presently available water soluble or dispersible adhesives are "natural" adhesives such as dextrins, cellulose gums, and animal glues derived from the hides and homes of animals and these adhesives have lower strength, fail to adhere well to paper and wood stocks with coatings or heavy ink applications, and sometimes require special treatment and handling because of their high viscosity. Therefore, the use of these adhesives, while being easily recyclable, is quite low due to poor adhesive characteristics. Attempts to produce synthetic water-dispersible hot melt adhesive compositions have heretofore been unsuccessful due to resulting poor adhesive properties such as thermal stability, low strength, poor viscosities and low cold flow resistance. Additionally, costs and ease in manufacturing have precluded their use (see U.S. Pat. Nos. 3,919,176 and 5,098,962).

In addition to paper and paper products, there are many disposable products, such as diapers, in which hot melt adhesives are used. The use of current hot melt adhesives in these products complicate attempts to recycle products and separate out the insoluble sticky hot melt adhesives.

In light of the above, it would be very desirable to produce a water-dispersible adhesive, particularly a hot melt adhesive, at reasonable costs that maintains the desirable properties of presently available adhesives.

SUMMARY OF THE INVENTION

The water-dispersible adhesive composition according to the present invention comprises a branched water-dispersible polyester composition made of the residues or moieties of reaction products;

(I) at least one difunctional dicarboxylic acid which is not a sulfomonomer;

(II) about 2 to 15 mol percent, based on the total of all acid, hydroxyl and amino equivalence, of residues of at least one difunctional sulfomonomer containing at least one sulfonate group bonded to an aromatic ring wherein the functional groups are hydroxyl, carboxyl, or amino;

(III) at least one diol or a mixture of a diol and a diamine comprising:

(A) about 0.1 to 85 mol percent, based on the total mol percent of diol moieties or diol and diamine moieties, of a diol or diamine having the formula $H(-OCH_2CH_2-)_nOH$ and $HRN(-(OH_2CH_2O-))_nNHR$ wherein n is 2 to about 20 and R is hydrogen or $C_1$-$C_6$ alkyl provided that the mol percent of such moieties is inversely proportional to the value of n;

(B) about 0.1 to 15 mol percent, based on the total mol percent of diol moieties or diol and diamine moieties, of moieties of a poly(ethylene glycol) having the formula $H(-OCH_2CH_2-)_nOH$ wherein n is 2 to about 500, provided that the mol percent of such moieties is inversely proportional to the value of n; and (C) 0 to greater than about 99 mol percent of the diol component or diol and diamine mixture being selected from the group consisting of a glycol and a mixture of glycol and diamine having two —NRH groups, the glycol containing two —$C(R^1)_2$—OH groups wherein $R^1$ in the reactant is a hydrogen atom, an alkyl of 1 to 5 carbon atoms, or an aryl group of 6 to 10 carbon atoms;

(IV) 0 to about 40 mol % of a difunctional monomer reactant selected from the group consisting of hydroxycarboxylic acids having one—$C(R-)_2$—OH group, aminocarboxylic acids having one—NRH group, aminoalkanols having one —$C(R-)_2OH$ group and one— NRH group and mixtures of said difunctional reactants wherein R in the reactant is hydrogen or an alkyl group of 1 to 6 carbon atoms; and (V) about 0.1 to 40 mol % of a "multifunctional" or "branch-inducing" reactant containing at least three functional groups selected from hydroxyl, carboxyl, amino, and mixtures thereof;

the polymer containing substantially equal mol proportions of acid equivalents (100 mol %) and diol or diol and diamine equivalents (100 mol %) wherein at least 20 weight percent of the groups linking the moieties of the monomeric units are ester linkages and wherein the inherent viscosity is at least 0.1 dL/g measured in a 60/40 parts by weight solution of phenol/tetrachloroethane at 25° C. and at a concentration of about 0.25 g of polymer in 100 ml of the solvent, the glass transition temperature $T_g$ is no greater than 20° C., and the ring and ball softening point is at least 70° C. Alternatively, the water-dispersible adhesive composition according to the present invention can be a blend of two different polyesters that comprises:

(1) about 20 to 80 weight percent of the linear water-dispersible polyester composition made of the residues or moieties of reaction products;

(i) at least one difunctional dicarboxylic acid which is not a sulfomonomer;

(ii) about 4 to 25 mol percent, based on the total of all acid, hydroxyl and amino equivalence, of residues of at least one difunctional sulfomonomer containing at least one sulfonate group bonded to an aromatic ring wherein the functional groups are hydroxyl, carboxyl, or amino;

(iii) at least one diol or a mixture of a diol and a diamine comprising:

(A) at least 15 mol percent, based on the total mol percent of diol moieties or diol and diamine moieties, of a diol or diamine having the formula $H(-OCH_2CH_2-)_nOH$ and $HRN-(CH_2CH_2O-)_nNHR$ wherein n is 2 to about 20 and R is hydrogen or $C_1$-$C_6$ alkyl, (B) about 0.1 to less than about 15 mol percent, based on the total mol percent of diol moieties or diol and diamine moieties, of moieties of a poly(ethylene glycol) having the formula $H(-OCH_2CH_2-)_nOH$ wherein n is 2 to about 500, provided that the mol percent of such moieties is inversely proportional to the value of n; and, (iv) 0 to about 40 mol percent moieties of a difunctional monomer reactant selected from hydroxycarboxylic acids, amino-carboxylic acids and aminoalkanols; the polymer containing substantially equal mol proportions of acid equivalents (100 mol %) and diol or diol and diamine equivalents (100 mol %) wherein at least 20 weight percent of the groups linking the moieties of the monomeric units are ester linkages and wherein the inherent viscosity is at least 0.1 dL/g measured in a 60/40 parts by weight solution of phenol/tetrachloroethane at 25° C. and at a concentration of about 0.25 g of polymer in 100 ml of the solvent; and (2) about 20 to 80 weight percent of the branched water-dispersible polyester made of the moieties of reaction products;

(a) at least one difunctional dicarboxylic acid which is not a sulfomonomer;

(b) about one to 20 mol percent, based on the total of acid, hydroxyl and amino equivalents, of residues of at least one difunctional sulfomonomer containing at least one sulfonate group bonded to an aromatic ring wherein the functional groups are hydroxyl, carboxyl, or amino;

(c) at least one difunctional reactant selected from a glycol or a mixture of glycol and diamine having two $-NRH$ groups, the glycol containing two $-C(R^1)_2-OH$ groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;

(d) 0 to about 40 mol % of a difunctional reactant selected from hydroxycarboxylic acids having one $-C(R-)_2-OH$ group, aminocarboxylic acids having one $-NRH$ group, amino-alcohols having one $-C(R-)_2-OH$ group and one $-NRH$ group, or mixtures of said difunctional reactants wherein R in the reactant is hydrogen or an alkyl group of 1 to 6 carbon atoms; and (e) 1 to 40 mol % of a "multifunctional" or "branch-inducing" reactant containing at least three functional groups selected from hydroxyl, carboxyl, amino, and mixtures thereof;

wherein all stated mol percents are based on the total of all acid, hydroxyl, and amino group containing reactants being equal to 200 mol percent, and wherein the polymer containing a portion of the acid-group containing reactants (100 mol percent acid) to hydroxyl and amino-group containing reactants (100 mol %).

The present invention also further comprises a process of applying the above water-dispersible adhesive composition between two substrates to form a laminate. The adhesive can later be separated from the substrates in recycling by repulping the entire laminate structure. This invention comprises applying the above water-dispersible adhesive composition in liquid form to a surface of a substrate and, while remaining in the liquid form, applying a second surface of a substrate to the water-dispersible adhesive composition thereby forming an article of manufacture that comprises the water-dispersible adhesive composition laminated between two substrates or two surfaces of a substrate.

The present invention also comprises the bonded articles of manufacture having the adhesive composition between two substrates such as in carton sealings, corrugated board and diaper construction.

DETAILED DESCRIPTION OF THE INVENTION

The applicants have unexpectedly discovered an improved adhesive composition that can be applied as a liquid dispersion (aqueous or solvent) on substrates as well as by hot melt application. The inventive adhesive composition not only has good aqueous adhesive properties but also has excellent hot melt adhesive properties and is totally recyclable when the products containing the adhesive are recycled by repulping. The present adhesive composition is easily repulpable and removed from the fibers from paper or wood pulp used in disposable products, particularly in the preferred hot melt applications. The adhesive according to the present invention permits recycling of disposable products at significantly reduced processing costs without affecting the physical properties of the adhesive and resulting article.

Certain water-dispersible polyester compositions are described in detail in U.S. Pat. Nos. 3,734,874; 3,779,993; 4,233,196; and 4,335,220, the disclosures of which are incorporated herein by reference in their entirety.

The water-dispersible adhesive composition according to the present invention that can be a single polyester is a branched water-dispersible polyester made of the residues or moieties of reaction products; (I); (II); (III); (IV) and (V) above.

Alternatively, the water-dispersible adhesive composition according to the present invention is a blend of two different polyesters that comprises: (1) about 20 to 80 weight percent of the linear water-dispersible polyester composition made of the residues or moieties of reaction products; (i); (ii); (iii); and (iv) above and (2) about 20 to 80 weight percent of the branched water-dispersible polyester made of the moieties of reaction products; (a); (b); (c); (d); and (e) above.

Although the inventive single polyester water-dispersible adhesive composition and the inventive water-dispersible adhesive composition that is a blend of two different polyesters have different amounts of monomers and a different mix of groups of monomers, some specific groups of suitable monomers and preferred monomers of these groups are the same as is illustrated below.

The sulfonate-containing, water-dispersible, adhesives and polyesters of this invention comprise polyesters, including polyesteramides, having repeating, alternating residues or moieties of one or more dicarboxylic acid which is not a sulfomonomer and one or more diols or a combination of one or more diols and one or more diamines wherein the mol percentages are based on 100 mol percent dicarboxylic acid residues and 100 mol percent diol or diol and diamine residues, for a total of 200 mol percent. Alternatively, the polyesters can include residues of monomers having mixed functionality such as hydroxycarboxylic acids, aminocarboxylic acids and/or aminoalkanols.

Examples of suitable difunctional dicarboxylic acid monomers used to make the residue of (I), (i), and (a) include aliphatic dicarboxylic acids, alicyclic dicarboxylic acids, aromatic dicarboxylic acids, or mixtures of two or more of these acids. Examples of preferred suitable dicarboxylic acids include succinic; glutaric; adipic; azelaic; sebacic; fumaric; maleic; itaconic; 1,4-cyclohexanedicarboxylic; 1,3-cyclohexanedicarboxylic; phthalic; terephthalic; and isophthalic. If terephthalic acid is used as the dicarboxylic acid component of the polyester, superior results are achieved when at least 5 mol percent of one of the other acids is also used. It should be understood that the use of the corresponding acid anhydrides, esters, and acid chlorides of these acids is included in the term "dicarboxylic acid".

The difunctional sulfo-monomer component of (II), (ii), and (b) is preferably a dicarboxylic acid or ester thereof containing a metal sulfonate group or a glycol containing a metal sulfonate group or a hydroxy acid containing metal sulfonate group. The cation of the sulfonate salt can be $NH_4^+$, or the metal ions $Li^+$, $Na^+$, $K^+$, $Mg^{++}$, $Ca^{++}$, $Cu^{++}$, $Ni^{++}$, $Fe^{++}$, $Fe^{+++}$ and the like.

Residue or reactant (II), (ii), and (b) in the polyester of the present invention is a difunctional monomer containing a —$SO_3M$ group attached to an aromatic nucleus, wherein M is hydrogen, $NH_4^+$, or a metal ion. The difunctional monomer component may be either a dicarboxylic acid or a diol adduct containing a —$SO_3M$ group. The cation of the sulfonate salt group can be $NH_4^+$, or the metal ions $Li^+$, $Na^+$, $K^+$, $Mg^{++}$, $Ca^{++}$, $Cu^{++}$, $Ni^{++}$, $Fe^{++}$, $Fe^{+++}$ and the like. Preferred are monovalent cations, such as $NH_4^+$, $Li^+$, $Na^+$, and $K^+$, when stability in water is desired.

The —$SO_3M$ group is attached to an aromatic nucleus, examples of which include benzene, naphthalene, anthracene, diphenyl, oxydiphenyl, sulfonyldiphenyl, and methylenediphenyl.

The cationic portion of a nonmetallic sulfonate group optionally present in reactant (II), (ii), and (b) is a nitrogen-based cation derived from nitrogen-containing bases which may be aliphatic, cycloaliphatic or aromatic basic compounds that have ionization constants in water at 25° C. of $10^{-3}$ to $10^{-10}$, preferably $10^{-5}$ to $10^{-8}$. Especially preferred nitrogen-containing bases are ammonia, dimethylethanolamine, diethanolamine, triethanolamine, pyridine, morpholine, and piperidine, due to availability, cost, and usefulness. Such nitrogen-containing bases and cations derived therefrom are described in U.S. Pat. No. 4,304,901, the disclosure of which is incorporated herein by reference in its entirety.

It is preferred that reactant (II) be present in a concentration of about 4 to 12 mol percent, more preferably about 6 to 10 mol percent, with a mol percent of about 8 being most preferred based on total acid equivalents. At amounts below 4 mol percent the polyester is less repulpable whereas at amounts above 12 mol percent the polyester is a little too water-sensitive.

It is preferred that reactant (ii) and, independently, reactant (b) be present in an amount of 2 to 25 mol percent, more preferably about 4 to 15 mol percent, based on the total acid equivalents.

Examples of preferred diols of (III) (A) and (iii) (A), due to availability, include diethylene glycol, triethylene glycol, and mixtures thereof. The preferred concentration of (III) (A) is about 10 to 80 mol percent, however, when these are the preferred diols of (III) (A) the concentration is about 20 to 80 mol percent. At amounts outside this range of 20 to 80 the polyesters have lower softening points and higher Tg than what is most desired.

The moieties of (III) (A) and (iii) (A) can be the same as (III) (B) and (iii) (B), respectively, when the value n is low. However, it is preferred that (B) be a different moiety and be a poly(ethylene glycol). Examples of suitable poly(ethylene glycols) of (III) (B) and (iii) (B) include relatively high molecular weight polyethylene glycols, some of which are available commercially under the designation "Carbowax", a product of Union Carbide. Poly(ethylene glycols) having molecular weights of from about 500 to about 5000 are especially suitable.

The moieties of (B) are preferably at a concentration of about 1 to 5 mol percent, particularly when n is 10 to 30, due to the preferably higher softening points. The remaining portion of the glycol component of (III), (iii), and (c) can consist of aliphatic, alicyclic, and aralkyl glycols. Examples of these glycols include neopentyl glycol; ethylene glycol; propylene glycol; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol and neopentyl glycol. Copolymers may be prepared from two or more of the above glycols. Preferred glycols, due to availability, cost, and usefulness, include neopentyl glycol, ethylene glycol, 1,3-propane diol, 1,4-butane diol, 1,6-hexane diol and cyclohexane dimethanols.

Advantageous examples of difunctional monomer component of (III) and (c) which are diamines include ethylenediamine; hexamethylenediamine; 2,2,4-trimethylhexamethylenediamine; 4-oxaheptane-1,4-diamine; 4,7-dioxadecane-1,10-diamine; 1,4-cyclohexanebismethylamine; 1,3-cyclohexanebismethylamine; heptamethylenediamine; dodecamethylenediamine, etc.

The amount of the moieties III (C) present in the polyester is preferably a minor amount up to about 99 mol percent, more preferably 20 to 80 mol percent with a mol percent of about 30 to 70 being more preferred due to the preferred balance between the desired low Tg and the desired high softening point.

Advantageous difunctional components which are aminoalcohols or aminoalkanols include aromatic, aliphatic, heterocyclic, and other types in regard to component (IV), (iv) and (d). Specific examples include 5-aminopentanol-1, 4-aminomethylcyclohexanemethanol, 5-amino-2-ethyl-pentanol-1, 2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —$CR_2$—OH group.

Advantageous difunctional monomer components which are aminocarboxylic acids include aromatic, aliphatic, heterocyclic, and other types in regard to component (IV), (iv), and (d) and include lactams. Specific examples include 6-aminocaproic acid, its lactam known as caprolactam, omega aminoundecanoic acid, 3-amino-2-dimethylpropionic acid, 4-(β-aminoethyl)benzoic acid, 2-(β-aminopropoxy)benzoic acid, 4-aminomethylcyclohexanecarboxylic acid, 2-(β-aminopropoxy)cyclohexanecarboxylic acid, etc. Generally, these compounds contain from 2 to 20 carbon atoms.

These moieties (IV) (iv) and (d) are less preferred, due to cost and performance, but they can be present. The concentration of these moieties is preferably below 20 mol percent, more preferably below 10 mol percent, including zero.

Preferred water dispersible linear polyesters of (1) in the polyester blend contain diacid monomer residues that are about 75 to 90 mol percent isophthalic acid residues, and about 10 to 25 mol percent 5-sodiosulfoisophthalic acid monomer residues; and diol monomer residues of about 45 to 100 mol percent diethylene glycol monomer residues and 0 up to 55 mol percent 1,4-cyclohexanedimethanol.

The more preferred water dispersible linear polyesters of (1) have an inherent viscosity of 0.1 to 0.6, preferably 0.2 to 0.5, and a Tg range of about 25 to 88° C., preferably about 29° to 55° C.

The branched water dispersible polyester of (2) is made of the moieties of the reaction products (a), (b), (c), (d), and (e) above.

Related branched water-dispersible polyesters of (2) above are disclosed in U.S. Pat. No. 5,218,042, the disclosure of which is incorporated herein by reference in its entirety. U.S. Pat. No. 5,218,042 is directed towards increasing the stability of dispersions in water and thus endcaps the acid groups or forms a diol adduct of a dicarboxylic sulfomonomer to maintain dispersion stability. However, the present inventive compositions are not directed towards maintaining a stable emulsion, simply producing an emulsion by pulping and dissolving the hot-melt adhesive in water until it is separated from the fibers. Therefore, endcapping and forming a diol adduct of the sulfomonomer is not a requirement for the present invention.

The polyester compositions are branched by virtue of the presence of a multifunctional reactant (V) and (e) that contains at least three functional groups selected from hydroxyl, carboxyl, and amino. Examples of preferred multifunctional reactants of (V) and (e) are trimethylpropane (TMP), trimethylolethane (TME), glycerine, pentaerythritol, erythritol, threitol, dipentaerythritol, sorbitol, trimellitic anhydride, pyromellitic dianhydride, and dimethylolpropionic acid with TMP being most preferred, due to availability and effective results.

The amount of this branching agent (V) and (e) is preferably below 20 mol percent, more preferably below 10 mol percent, (including the range for (V) of 0.5 to 10), with a concentration of about 1 to 7 or 2 to 6 mol percent being most preferred. At very high amounts of branching agent the polyester is prone to gelation whereas at low amounts, such as below 0.5 and 0.1, the polyester has poorer performance and properties.

The dispersible linear polyester composition of (1) is blended with the branched water-dispersible polyester composition of (2) at temperatures greater than 200° C., preferably about 225° C., for at least one hour. In the adhesive blend composition according to the present invention the relative amounts of the two polyesters vary from about 20 to 80 weight percent of the polyester of (1) and about 20 to 80 weight percent of the polyester of (2). The concentration of these two polyesters in the hot melt adhesive composition according to the present invention is preferably greater than 30 but less than 80 weight percent polyester of (1) and greater than 20 but less than 70 weight percent of the polyester of (2). The concentration of the two polyesters is more preferably about 40 to 77 weight percent (1) and about 23 to 60 weight percent of (2), even more preferably about 60 to 75 weight percent of (1) and about 25 to 40 weight percent of (2) with a concentration of the two polyesters in weight percent of about 70 (1) and about 30 (2) being most preferred. Higher amounts of the polyester of (1) increase the melting point of the final adhesive composition. At amounts of the polyester of (1) higher that 80 weight percent, the adhesive has too high of a melting point to be practical. Higher amounts of the polyester of (2) decrease the melting point of the final adhesive. At amounts of the polyester of (2) higher that 80 weight percent, sometimes higher than 70, the adhesive has too low of a melting point to be practical.

The polyesters according to the present invention preferably have at least 50 weight percent of the linking groups linking the moieties of the monomeric units being ester linkages, more preferably at least 90 weight percent, with an ester linkage weight percent of 100 being most preferred.

The water-dispersible polyesters described herein have an inherent viscosity of at least 0.1 dL/g, preferably about 0.2 to 0.5 dL/g, measured in a 60/40 parts by weight solution of phenol/tetrachloroethane at 25° C. and at a concentration of about 0.25 g of polymer in 100 ml of solvent.

The final adhesive compositions preferably have a number average molecular weight of about 2,000 to 20,000 more preferably about 3,000 to 10,000. Although it is desirable to have as high a molecular weight as possible to achieve the maximum physical properties, such as tensile strength and peel strength, the melt viscosity also increase as molecular weight increases. Therefore, at very high molecular weights the melt viscosity is too high for many useful applications.

The preferred Tg of the adhesive composition according to the present invention is below 10° C. and more preferably varies from about 4° to −20° C., with a Tg of about 4° to −13° C. being most preferred. The Tg (glass transition temperature) of the adhesive compositions of the present invention are preferably as low as possible. Thus Tgs below 4° C. and even below 0° C. are preferred. Tgs of greater than 0° C. have generally higher ring and ball softening point (RBSP) and heat resistance but are not as flexible. A low Tg means that the adhesive compositions will not be brittle, thus, cartons adhered together with the adhesive compositions of the present invention when impacted, even at extremely cold temperatures will not shatter and thus maintain adhesion. However, extremely low Tgs are not easily obtained or at least not easily obtained without greatly affecting some other property, such as lowering the ring and ball softening point.

The hot melt adhesive composition according to the present invention preferably has a viscosity of about 1,500 to about 30,000 centipoise at 350° F. (177° C.), more preferably about 3,000 to 15,000 cP at 350° F. (177° C.) due to ease in application.

The ring and ball softening point (RBSP) of the adhesive composition of the present invention is preferably at least 80° C., more preferably 80° to 100° C. The high temperatures of RBSP are better since this means at higher storage temperatures delamination will not occur. (High RBSP provides delamination resistance).

The adhesive compositions according to the present invention are particularly useful due to their good combination of properties and are suitable for use as adhesives for many substrates including non woven assemblies (such as non woven polypropylene), paper products (such as paper and paperboard), and wood pulp and are easily recyclable and repulpable. The hot melt adhesives according to the present invention are recyclable/repulpable and improved over prior art repulpable hot melt adhesive compositions in that the set time, temperature sensitivity, compatibility, stability on storage, shear strength, tensile strength, viscosity, and cold flow resistance are improved.

The adhesive composition according to the present invention is applied to one substrate with a second substrate being placed on top of the adhesive forming an article having the adhesive laminated between two substrates.

The adhesive composition according to the present invention can be applied in liquid form in solvent or in an aqueous solution at a concentration of about 10 to 70 weight percent with the remainder being solvent or water or mixtures thereof. Surfactants and other additives can also be present to aid in the dispersibility of the adhesive composition. When applied as a solution, the adhesive compositions are generally applied by conventional processes, such as extrusion coating, spray coating, roll coating, brush coating, dip coating, etc.

The adhesive composition according to the present invention is preferably used as a hot melt adhesive. The hot melt adhesive composition is preferably applied in the melt at a temperature of about 150° to 200° C. to a surface of a substrate and, while remaining molten and pliable, applying a second surface of a substrate to the water-dispersible hot melt adhesive composition thereby forming an article of manufacture that comprises the water-dispersible hot melt adhesive composition laminated-between two substrates or two surfaces of a substrate.

The adhesive compositions of the present invention are preferably not crosslinked since that would impair their water dispersibility and repulpability. However, they could be crosslinked, to a certain extent with diisocyanates to improve strength and heat resistance although this is less preferred.

The adhesive composition according to the present invention can also contain standard additives including stabilizers, preferably about 0.1 to about 0.5 weight percent stabilizers. Suitable stabilizers include the antioxidant type and generally consist of sterically hindered phenols, or sulfur or phosphorous substituted phenols. An especially useful antioxidant is Irganox 1010 (from Ciba-Geigy, Hawthorne, N.Y.) which is a pentaerythritol tetrakis-3(3,5-di-tertiarybutyl-4-hydroxyphenyl)propionate.

Additional additives can be added to raise and lower Tg and RBSP. These include, for example, elastomers, plasticizers, low molecular weight polyolefins, resins, and tackifiers. Although, elastomers can be added to the polyester composition, the presence of such elastomers may be adverse to certain desired properties of the composition. Therefore, it is preferable that the composition of the present invention contain substantially no elastomer. Additionally, the plasticizers such as DOP, DOTP, phenols, glycols, phthalate esters and the like that can be added, can distract from the heat resistance of the final composition lowering the RBSP.

Other additives such as UV light absorbers, nucleating agents, colorants, pigments, solvents, and fillers can be present in small amounts as needed and known in the adhesive art.

Tackifiers are added to the polyester composition to prevent cold flow and increase the softening point. Tackifiers are typically selected from at least one of the groups consisting of hydrocarbon resins, synthetic polyterpenes, functional copolymers, and rosin esters. Hydrocarbon resins are disclosed in U.S. Pat. No. 3,850,858 and functional copolymers, such as styrene-co-maleic anhydride, are well known in the art. Hydrocarbon resins, prepared according to U.S. Pat. NO. 3,701,760, polyterpenes, and rosin esters can be used alone or in combinations. These tackifying resins, which preferably have softening points of at least 100° C. and most preferably 120° C., can be used in amounts of about 10% to 50% by weight of the adhesive composition, preferably about 25% to about 40% by weight. Suitable resins and rosin esters are the terpene polymers having a suitable ring and ball softening point such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut of fraction, and various other terpenes. Commercially available resins of the terpene type include the Zonarez terpene B-series and 7000 series from Arizona Chemical. Also included are the rosin esters with acid numbers above 5 such as the Zonatac resins from Arizona Chemical. Particularly useful materials are terpene mixtures containing a mixture of sulphate terpene, and at least 20% of at least one other terpene selected from the group consisting of pinene, limonene, or dipentene.

These adhesive compositions can also be modified to increase the RBSP and reduce cold flow by including additives such as precipitated calcium carbonates and silicas such as fumed silica. A suitable fumed silica comes from Cabot Corp. as CABOSIL.

The present copolyester composition can be modified with random or alternating styrenic copolymers useful in the compositions of this invention and may be prepared by any of the several methods available for their synthesis. For example, the copolymers may be obtained by solution copolymerization directly from the respective monomers by the incremental additions of the more reactive monomer as taught by U.S. Pat. No. 2,971,939 or by a continuous recycle polymerization process described in U.S. Pat. Nos. 2,769, 804 and 2,989,517. Suitable commercially available random or alternating copolymers include the "Dylark" styrene/ maleic anhydride copolymers. Suitable blocked copolymers for example from Shell Chemical, include Kraton FG-1901X or Kraton FG-1921X linear styrene ethylene-1-butene styrene blocked copolymers. In formulating adhesives or sealants for use herein, the blocked copolymers should be used of 5–20%, preferably 7–12%.

Modified polyolefins suitable for use in the present invention are prepared by reacting a polyolefin with unsaturated polycarboxylic acid, anhydride or esters thereof, such as maleic anhydride. In formulating adhesive or sealants for use herein the modified polyolefins should be used in low amounts from 3–15% preferably 5–9%. These modified polyolefins can enhance heat resistance of the composition.

The adhesive composition of this invention can be prepared using one or more modifiers to the branched copolyester, by blending with the polyester at melt temperatures of 177–200° C. and mixing until a homogeneous mixture is obtained. A cowles stirrer provides effective mixing for these preparations.

The following examples are intended to illustrate the present invention but are not intended to limit the reasonable scope thereof.

EXAMPLES

In the following examples GEL Permeation Chromatography (GPC) is used for determination of the molecular weight distribution averages: Mw, Mn, Mw/Mn (polydispersity), and Mz.

In the following examples the Peel Adhesion Failure Temperature was determined according to the following procedure to find the 180° peeling tension fail. This is determined by subjecting a specimen to a continuous dead weight loading of 100 grams per inch (2.54 cm) of bond width for 10 minutes at a given temperature.

The adhesive is laminated onto 30 pound (13.6 kg) kraft paper to a thickness of 1 mil (2.54×10$^{-3}$ cm) and a width of 1.5 inches (3.8 cm). Another section of kraft paper is placed on top of the adhesive laminate. The test specimen is heat sealed at 122° C. at 25 psi (0.17 kpa) for 0.2 seconds. Three specimens are prepared. The bonded peel specimens must condition overnight in a laboratory at 23° C. at 50% humidity before testing. The oven temperature is set at 14° C., the three specimens are placed therein, and a 100 gram weight is attached to each. The specimens are conditioned in the oven for 10 minutes, and the temperature is then raised 4° C. at 10 minute intervals. The Peel Adhesion Failure Temperature is the temperature in degrees C at failure (3 test average).

Example 1

Preparation and Testing of Branched Polyester Control

A 1000 mL round bottom flask equipped with a ground-glass head, agitator shaft, nitrogen inlet, and a sidearm was charged with 139.4 grams (0.84 mole) of isophthalic acid, 23.4 grams (0.16 mole) adipic acid, 95.4 grams (0.90 mole) diethylene glycol, 31.2 grams (0.30 mole) neopentyl glycol, 6.7 grams (0.05 mole) trimethylol propane, 10.0 grams (0.01 mole) of poly(ethylene glycol), MW=1000, and 1.05 mL of a 1.46% (w/v) solution of titanium isopropoxide in n-butanol. The flask was purged with nitrogen and immersed in a Belmont metal bath at 200° C. for 90 minutes and 220° C. for an additional 90 minutes under a slow nitrogen sweep with sufficient agitation. After elevating the temperature to 280° C. a vacuum<=0.5 mm was installed 11 minutes to perform the polycondensation. The vacuum was then displaced with a nitrogen atmosphere and the polymer was allowed to cool after removing the flask from the metal bath. An inherent viscosity of 0.371 dL/g was determined for the recovered polymer according to ASTM D3835-79 and a glass transition temperature of 3° C. was obtained from thermal analysis by DSC. The polymer was clear and amorphous. Molecular weights as determined by GPC were: Mn =10,400, Mw =32,250, and Mz =104,150. The properties of this resin are illustrated in Table 1. This sample when placed in tap water, pH approximately equal to 8, was insoluble and would not be suitable for application as a repulpable adhesive.

Example 2

Preparation of Branched Water-Dispersible Polyester

A 1000 mL round bottom flask equipped with a ground-glass head, agitator shaft, nitrogen inlet, and a sidearm was charged with 192.0 grams (1.15 moles) of isophthalic acid, 35.1 grams (0.24 mole) adipic acid, 31.1 grams (0.105 mole) dimethyl-5-sodiosulfoisophthalate, 143.1 grams (1.35 mole) diethylene glycol, 46.8 grams (0.45 mole) neopentyl glycol, 10.05 grams (0.075 mole) trimethylol propane, 30.0 grams (0.03 mole) of poly(ethylene glycol), MW=1000, and 1.67 mL of a 1.46% (w/v) solution of titanium isopropoxide in n-butanol. The flask was purged with nitrogen and immersed in a Belmont metal bath at 200° C. for 90 minutes and 220° C. for an additional 90 minutes under a slow nitrogen sweep with sufficient agitation. After elevating the temperature to 280° C. a vacuum<=0.5 mm was installed for 15 minutes to perform the polycondensation. The vacuum was then displaced with a nitrogen atmosphere and the polymer was allowed to cool after removing the flask from the metal bath. An inherent viscosity of 0.258 dL/g was determined for the recovered polymer according to ASTM D3835-79 and a glass transition temperature of 9° C. was obtained from thermal analysis by DSC. The clear polymer was stabilized with 0.3 grams of Irganox 1010. Molecular weights as determined by GPC were: Mn=6,500, Mw =13,200, and Mz =20,800. The properties of this resin are illustrated in Table 1.

Example 3

Preparation of Branched Water-Dispersible Polyester

A 1000 mL round bottom flask equipped with a ground-glass head, agitator shaft, nitrogen inlet, and a sidearm was charged with 184.0 grams (0.92 moles) of dimethyl cyclohexanedicarboxylate, 23.7 grams (0.24 mole) dimethyl-5-sodiosulfoisophthalate, 95.4 grams (0.90 mole) diethylene glycol, 31.2 grams (0.30 mole) neopentyl glycol, 6.70 grams (0.05 mole) trimethylol propane, and 1.17 mL of a 1.46% (w/v) solution of titanium isopropoxide in n-butanol. The flask was purged with nitrogen and immersed in a Belmont metal bath at 200° C. for 90 minutes and 220° C. for an additional 90 minutes under a slow nitrogen sweep with sufficient agitation. After elevating the temperature to 280° C. a vacuum<=0.5 mm was installed for 10 minutes to perform the polycondensation. The vacuum was then displaced with a nitrogen atmosphere and the polymer was allowed to cool after removing the flask from the metal bath. An inherent viscosity of 0.210 dL/g was determined for the recovered polymer according to ASTM D3835-79 and a glass transition temperature of −4° C. was obtained from thermal analysis by DSC. The polymer was clear and nearly colorless. Molecular weights as determined by GPC were: Mn=5,800, Mw=10,400, and Mz=15,500. The properties of this resin are illustrated in Table 1.

Example 4

Preparation of Branched Water-Dispersible Polyester

A 1000 mL round bottom flask equipped with a ground-glass head, agitator shaft, nitrogen inlet, and a sidearm was charged with 128.0 grams (0.77 mole) of isophthalic acid, 23.4 grams (0.16 mole) adipic acid, 23.7 grams (0.08 mole) dimethyl-5-sodiosulfoisophthalate, 95.4 grams (0.90 mole) diethylene glycol, 31.2 grams (0.30 mole) neopentyl glycol, 6.70 grams (0.05 mole) trimethylol propane, 10.0 grams (0.01 mole) of poly(ethylene glycol), MW=1000, and 1.09 mL of a 1.46% (w/v) solution of titanium isopropoxide in n-butanol. The flask was purged with nitrogen and immersed in a Belmont metal bath at 200° C. for 90 minutes and 220° C. for an additional 90 minutes under a slow nitrogen sweep with sufficient agitation. After elevating the temperature to 280° C. a vacuum <=0.5 mm was installed for 10 minutes to perform the polycondensation. The vacuum was then displaced with a nitrogen atmosphere and the polymer was allowed to cool after removing the flask from the metal bath. An inherent viscosity of 0.226 dL/g was determined for the recovered polymer according to ASTM D3835-79 and a glass transition temperature of 13° C. was obtained from thermal analysis by DSC. The clear polymer was stabilized with 0.3 grams of Irganox 1010. Molecular weights as determined by GPC were: Mn=7,300, Mw=14,000, and Mz =22,600. The properties of this resin are illustrated in Table 1.

TABLE 1

PROPERTIES OF ADHESIVE COMPOSITIONS

| Example No., | (a) Set Time (sec) | (b) Viscosity @ 177° C. cps | (c) Tensile Strength (mpa) elongation % | (d) Peel Adhesion Failure Temperature °C. | (e) Tg °C. | (f) Ring and Ball Softening Point °C. |
|---|---|---|---|---|---|---|
| 1 | 7.0 | 4,120 | — | 34 | 3 | 70 |
| 2 | 6.1 | 3,840 | .09 > 1200% | 35 | 9 | 82 |
| 3 | 4.2 | 3,570 | .03–09 > 1200% | 30 | –13 | 82 |
| 4 | 3.6 | 4,630 | 1.0, 873% elongation | 40 | 13 | 90 |

(a) TAPPI Symposium, Recyclable/Repulpable Hot Melts - A Summary, June 1990, by Michael J. Ambrosini
(b) ASTM D3236 Test Method
(c) ASTM 412 Test Method
(d) Kraft to kraft bond
(e) ASTM D3418
(f) ASTM E-28

Example 5

Repulpability Test (Neutral)*

Approximately 10 grams of each of the adhesives in Examples 2,3 and 4 were melted, dyed, and coated onto white bond copier paper to a thickness of 1.5 to 3.0 mils (0.04 to 0.08 mm) with a wire wound rod. The coated paper was then cut to obtain a piece weighing 12 grams. The weighed coated paper was then torn into 1" by 1" (2.54 cm by 2.54 cm) pieces and placed into approximately 1000 mL of tap water in the bowl of a laboratory blender to obtain a solids to liquid consistency of ~1.2% and soaked from 1 to 4 hours. The coated paper and water were agitated at 500 rpm for 10 minutes, at 1,000 rpm for 10 minutes, and 1,500 rpm for 10 minutes. Following agitation, a portion of the slurry was removed from the bowl and diluted to produce a 0.7% solids mixture. This mixture was stirred for 30 seconds and quickly poured into a Buchner funnel that contains a 100 mesh polyester screen. A vacuum pump was attached for a short interval until the water was evacuated from the funnel and a handsheet was formed. The handsheet and screen were then removed from the funnel and excess water was blotted away with Watman 5 filter paper. The handsheet was then weighted and dried on a warm hot plate. The dried handsheet was then inspected for "stickies" using both transmitted and reflected light.
*Tappi, 1993, Hot Melt Symposium Procedure, Barrett All three examples were completely dispersible, in that during the hour soak in a room temperature neutral solution all dyed coating samples completely separated from copy paper. During agitation, the solution was foamy and a sweet odor was noticed. No adhesive residue (stickies) were on the hand sheet. Thus, there was complete repulpability. This test showed that the compositions in Examples 2, 3 and 4 were highly water dispersible and repulpable under neutral conditions.

Example 6

Repulpability in Alkaline Solution*

An alkaline solution was prepared by adding 6.2 g of NaOH pellets, 3 g of tetrasodium pyrophosphate (TSPP) and 0.6 ml of Triton x-100 surfactant to 400 ml of $H_{2O}$ at room temperature. The solution was warmed on a hot plate to 27° C. When the TSPP had dissolved, it was diluted to 1000 ml and adjusted to a pH of 9–12 with $H_2O$ or base. The solution was then brought to 85° C. and then 1"×1" (2.54×2.54 cm) pieces of coated paper from Examples 2, 3 and 4 prepared as in Example 5 were added as the solution was slowly stirred at the blend station. When coated paper began to de-fiber, the mixer speed was adjusted to give a gentle rolling of slurry. Mixing was continued for 15–30 minutes. After defibering for 15–30 minutes, slurry was diluted to 1000 ml and stirred thoroughly to assure a uniform suspension. The handsheet was formed as in Example 5. The degree of adhesive repulpability was evaluated as in Example 5.
*Tappi, 1993, Hot Melt Symposium Procedure, Barrett All three examples were completely dispersible, in that dyed coating sample began separating from the copy paper within 5 minutes of entering the heated (85° C.) alkaline solution. During the 30 minute agitation the coating completely dispersed throughout solution. There was a pale orange color visible in handsheet; however, no adhesive residue (stickies) was on hand sheet. Thus, there was complete repulpability. The results indicate that Examples 2, 3 and 4 are repulpable under alkaline conditions.

Example 7

Dispersibility of Adhesive Coated Wood Pulp

Wood pulp (5 grams) taken from a Huggies brand diaper from Kimberly Clark, was coated with 1.5 grams of the adhesive from Examples 2, 3 and 4 at 350° F. (177° C.). The adhesive coated wood pulp was placed in one liter of tap water (pH 7.9) at room temperature for one hour with hand stirring approximately every 10 minutes. The slurry was poured through a 600 mL Hirsch funnel pulled under vacuum at 25 psi until water is completely removed out of the funnel. The wood pulp remained in the funnel without any sign of adhesive present in the funnel. All of the adhesive passed through the funnel into the container with the water.

Example 8

Solubility of Examples 2, 3, and 4

A one gram sample of each polyester from Examples 2, 3, and 4 was placed in tap water (pH 8.0), deionized water (pH 7.2) and two simulated body fluids. The first simulated body fluid containing 10 gms. sodium chloride, 4 gms. ammonium carbonate, 1 gm disodium hydrogen phosphate, and 0.25 grams histidine monohydrochloride, dissolved in 1 liter of deionized water, with a final pH 8.0. The second simulated body fluid containing 10 grams sodium chloride, 1 gram lactic acid, and 1 gram disodium hydrogen phosphate, and 0.25 gram histidine monohydrogenchloride, dissolved in 1 liter deionized water, with a final pH of 3.9

Test Results Examples 2, 3, and 4 dissolved in less than one hour immersion in tap water and deionized water and remained insoluble in simulated body fluid solution after 24 hours immersion.

The following examples 1B-through 9B are examples of the adhesive composition according to the present invention that is a blend of two polyesters. These examples were tested according to the test used in the prior examples except for Gel Permeation Chromatography (GPC) which used a polystyrene standard.

GPC is used for determination of the molecular weight distribution averages: Mw, Mn, Mw/Mn (polydispersity), and Mz. Approximately 60 milligrams of sample is weighed and dissolved in 20 ml. of tetrahydrofuran (THF) containing toluene (internal std.) at a level of 0.3% (v/v). The sample is filtered (if necessary) and then run on the GPC system. The data system generates a report showing: (1×) the molecular weight distribution averages, (2×) a time slice report, and (3×) standard, purchased from Polymer Laboratories, covering a molecular weight range of 580 to 1,030,000. The mode of calibration is "Narrow MW Standard Peak Positions".

Example 1B

Preparation of Linear Water-Dispersible Polyester Composition 1

A 500-mL, round bottom flask equipped with a ground-glass head, an agitator shaft, nitrogen inlet, and a sidearm was charged with 73.87 g (0,445 mol) of isophthalic acid, 14.74 g (0,055 mol) of 5-sodiosulfoisophthalic acid, 81 g (0.75 mol) of diethylene glycol, 0.19 grams of titanium tetraisopropoxide and 0,847 g (0.0055 mol) of sodium acetate tetrahydrate. The flask was immersed in a Belmont bath at 200° C. for two hours under a nitrogen sweep. Heating was stopped and the copolyester was removed from the flask. The polymer had an inherent viscosity of 0.45 dL/g according to ASTM D3835-79 and a glass transition temperature of 29° C. as measured by differential scanning colorimetry (DSC) analysis. The polymer which was transparent and amorphous was extruded and pelletized. The polymer had a weight average molecular weight (Mw) of 8,924 and a number average molecular weight (Mn) of 5,422 by GPC using a polystyrene standard.

Example 2B

Preparation of Branched Water-Dispersible Polyester Composition 2

To a three-neck round-bottom flask equipped with a mechanical stirrer, a stream partial condenser a Dean-Stark trap, and a water condenser were charged the following reactants: neopentyl glycol (363.38 g, 3.49 m), 5-sodiosulfoisophthalic acid (29.30 g, 0.109 m) and the catalyst, Fascat 4100 (Atochem North America, Inc.) (0.56 g). The mixture was heated to 150° C. and stirred under $N_2$ atmosphere and the temperature then gradually increased to 220° C. and the distillate (water) was collected in the Dean-Stark trap until the mixture was clear (about 1 hr). The acid number was determined to be close to zero, and the mixture was cooled to 150° C. The second stage reactants, trimethylolpropane (75.4 g, 0.563 m), isophthalic acid (329.01 g, 1.98 m) and adipic acid (202.25 g, 1.38 m) were then added. The temperature was gradually raised to 220° C. and the reaction continued for four more hours to yield a resin with an acid number of 3.6. The polymer had a weight average molecular weight (Mw) of 6,241, a number average molecular weight (Mn) of 1,740 and a polydispersity index of 3.6, determined by GPC using a polystyrene standard.

Example 3B

Preparation of a Water-Dispersible Hot-Melt Adhesive

A blend of the linear water-dispersible polyester polymer 1 prepared as in Example 1B (70 parts) by weight and the branched water-dispersible polyester polymer 2 of Example 2B (30 parts) by weight was prepared by combining the two polymers and stirring at about 225° C. for 2 hours to produce the adhesive composition. The composition had a Tg of about 11° C., a weight average molecular weight of 5,410, a number average molecular weight of 1,554, and a viscosity of 19,450 centipoise at 350° F. (175° C.) as determined on a Brookfield HV: II Viscometer. The adhesive had a fast set time, as determined by a standard procedure (TAPPI Symposium, Recyclable/Repulpable Hot Melts —A Summary —U.S.A. and Europe, June, 1990, by Michael J. Ambrosini) on a corrugated kraftboard substrate, good lap sheer strength (ASTM D1002 Test Method) and good tensile strength (ASTM 412 Test Method). The results are reported in Table 2. Into 100 ml of hot water (65°–80° C.) at a pH of 7.8, were mixed 0.5 grams of adhesive chips. Within 15 minutes under mild agitation the adhesive was completely dispersed in the water, forming a milky mixture. Repulpability results are in Tables 3 and 4.

Example 4B

An adhesive composition was prepared by blending 60 parts by weight of the linear water-dispersible polymer prepared as in Example 1B with 40 parts by weight of the branched water-dispersible polyester of Example 2B and the properties of the polymer and the polymer and adhesive properties determined as in Example 3B above. The adhesive properties are reported in Table 2. The adhesive chips were dispersed in hot water as in Example 3B within 15 minutes. The adhesive had good repulping properties (see Tables 2 and 3), a Tg of about 8.4° C., a weight average molecular weight of 5,272, a number average molecular weight of 1,563 and a viscosity of 17,400 centipoise at 350° F. (175° C.).

Example 5B

An adhesive composition was prepared by blending 40 parts by weight of the linear water-dispersible polymer prepared as in Example 1B with 60 parts by weight of the branched water-dispersible polyester of Example 2B and the properties of the adhesive composition determined as in Example 3B. The adhesive properties are reported in Table 2. The adhesive chips were dispersed in hot water as in Example 3B within 15 minutes. The adhesive had good repulping properties (see Tables 3 and 4), a Tg of 4.2° C. a weight average molecular weight of 7,622, a number average molecular weight of 1,715 and a viscosity of 2,500 centipoise at 350° F. (175° C.).

Example 6B

An adhesive composition was prepared by blending 30 parts by weight of the linear water-dispersible polyester prepared as in Example 1B with 70 parts by weight of the branched water-dispersible polyester of Example 2B and the properties of the adhesive composition determined as in Example 3B. The adhesive properties are reported in Table 2. The adhesive chips were attempted to be dispersed in hot water as in Example 3B, however, only partial dispersion occurred. The adhesive had marginal repulping properties (see Tables 3 and 4), a Tg of 4.4° C., a weight average molecular weight of 7,316, a number average molecular weight of 1,831 and a viscosity of 2,490 centipoise at 350° F.

TABLE 2

| | PROPERTIES OF ADHESIVE COMPOSITIONS | | | |
|---|---|---|---|---|
| Example No. | (a) Set Time (sec) | (b) Lap Shear (mpa) | (c) Tensile Strength (mpa) | (d) Peel Adhesion Failure Temperature °C. |
| 3B | 1.7 | 8.6 | 2.9 | 43 |
| 4B | 1.4 | 1.3 | 1.4 | 43 |
| 5B | 1.8 | 4.3 | .3 | 30 |
| 6B | 3.6 | 4.3 | .1 | — |

(a) TAPPI Symposium, Recyclable/Repulpable Hot Melts - A Summary, June 1990, by Michael J. Ambrosini
(b) ASTM D1002 Test Method
(c) ASTM 412 Test Method
(d) Kraft to kraft bond Example 7B Repulpability Test (Neutral)

Approximately 10 grams of each of the adhesives in Examples 3B, 4B, 5B, and 6B were melted, dyed, and coated onto white bond copier paper to a thickness of 1.5 to 3.0 mils (0.04 to 0.08 mm) with a wire wound rod. The coated paper was then cut to obtain a piece weighing 12 grams. The weighed coated paper was then torn into 1" by 1" (2.54 cm by 2.54 cm) pieces and placed into approximately 1000 mL of tap water in the bowl of a laboratory blender to obtain a solids to liquid consistency of ~1.2% and soaked from 1 to 4 hours. The coated paper and water were agitated at 500 rpm for 10 minutes, at 1,000 rpm for 10 minutes, and 1,500 rpm for 10 minutes. Following agitation, a portion of the slurry was removed from the bowl and diluted to produce a 0.7% solids mixture. This mixture was stirred for 30 seconds and quickly poured into a Buchner funnel that contains a 100 mesh polyester screen. A vacuum pump was attached for a short interval until the water was evacuated from the funnel and a handsheet was formed. The handsheet and screen were then removed from the funnel and excess water was blotted away with Watman 5 filter paper. The handsheet was then weighted and dried on a warm hot plate. The dried handsheet was then inspected for "stickies" using both transmitted and reflected light. The repulpability properties are reported in Table 3. This test showed that the adhesive of Example 3B is the most highly water-dispersible.

TABLE 3*

| | Repulp Evaluations Unconditional (Neutral) | | |
|---|---|---|---|
| EXAMPLE 3B Completely Dispersible | EXAMPLE 4B Partial | EXAMPLE 5B Partial | EXAMPLE 6B Not/Very Slightly Dispersible |
| Dispersion of material began immediately upon exposure of coated paper to water, producing a milky solution. | Material began to disperse from paper after 2 minutes in water. Material was off the paper and into milky solution | Polymer began to disperse from paper immediately on exposure to water. Nearly complete dispersion after 20 minutes soaking. Formed milky solution during soaking. | No dispersion of polymer from paper was seen during soaking period of 1 hr.<br><br>HANDSHEET |
| Appeared to be completely dispersed after 15 minutes of soaking in water with NO | after 30 minutes in water. Ring of dispersed material noticed at bottom of soaking beaker | | Gummy residue noticed in pulper after agitation.<br><br>Handsheet had |

TABLE 3*-continued

| Repulp Evaluations Unconditional (Neutral) | | | |
|---|---|---|---|
| EXAMPLE 3B Completely Dispersible | EXAMPLE 4B Partial | EXAMPLE 5B Partial | EXAMPLE 6B Not/Very Slightly Dispersible |
| AGITATION. HANDSHEET Very little evidence of adhesive remaining in handsheet. | after 1 hr. HANDSHEET Gummy residue noticed in pulping vessel following agitation. Some visible adhesive specks noticed in handsheet. | HANDSHEET Gummy residue noticed in pulper after agitation. Undispersed polymer and undefibered paper were noticed in handsheet. | sticky areas of polymer throughout. Difficult to remove handsheet from filter screen after handsheet formed. Some sticky polymer remained on screen. |

*Tappi, 1993, Hot Melt Symposium Procedure, Barrett

Example 8B

Repulpability in Alkaline Solution

An alkaline solution was prepared by adding 6.2 g of NaOH pellets, 3 g of tetrasodium pyrophosphate (TSPP) and 0.6 ml of Triton x-100 surfactant to 400 ml of $H_2O$ at room temperature. The solution was warmed on a hot plate to 27° C. When the TSPP had dissolved, it was diluted to 1000 ml and adjusted to a pH of 9–12 with $H_2O$ or base. The solution was then brought to 85° C. and then 1"×1" (2.54×2.54 cm) pieces of coated paper prepared as in Example 7B were added as the solution was slowly stirred at the blend station. When coated paper began to defiber, the mixer speed was adjusted to give a gentle rolling of slurry. Mixing was continued for 15–30 minutes. After defibering for 15–30 minutes, slurry was diluted to 1000 ml and stirred thoroughly to assure a uniform suspension. The handsheet was formed as in Example 7B. The degree of adhesive repulpability was evaluated as in Example 7B. The results are reported in Table 4.

Example 9B

Dispersibility of Adhesive Coated Wood Pulp

Wood pulp (5 grams) taken from a Huggies brand diaper from Kimberly Clark, was coated with 1.5 grams of the adhesive from Example 5B at 350° F. (177° C.). The adhesive coated wood pulp was placed in one liter of tap water (pH 7.9) at room temperature for one hour with hand stirring approximately every 10 minutes. The slurry was poured through a 600 mL Hirsch funnel pulled under vacuum at 25 psi until water is completely removed out of the funnel. The wood pulp remained in the funnel without any sign of adhesive present in the funnel. All of the adhesive passed through the funnel into the container with the water.

We claim:

1. A water-dispersible adhesive composition comprising:
   (1) about 20 to 80 weight percent of the linear water-dispersible polyester composition made of the residues or moieties of reaction products;
   (i) at least one difunctional dicarboxylic acid which is not a sulfomonomer;
   (ii) about 4 to 25 mol percent, based on the total of all acid, hydroxyl and amino equivalence, of residues of at least one difunctional sulfomonomer containing at least one sulfonate group bonded to an aromatic ring

TABLE 4*

| Repulp Evaluations Alkaline (pH = 10.6) | | | |
|---|---|---|---|
| EXAMPLE 3B Completely Dispersible | EXAMPLE 4B Complete Dispersion | EXAMPLE 5B Partial | EXAMPLE 6B Partial |
| Dispersion began immediately upon exposure to alkaline solution. Final handsheet appeared free of dye and adhesive. | Dispersion began immediately on exposure of coated paper to alkaline solution. No adhesive apparent in handsheet. | Gummy residue noticed in pulper following agitation AND on filtration screen after formation of handsheet. | Some dispersion before agitation. Thick "pudding like" residue produced during alkaline agitation. Dried "circles" of residue were seen on filter side of handsheet. Handsheet difficult to remove from filter screen. |

*Tappi, 1993, Hot Melt Symposium Procedure, Barrett

The above results show that adhesive prepared in Example 3B is best followed by Example 4B. Although the adhesive from Examples 5B and 6B were only partially repulped in alkaline solution, this is significantly improved over conventional hot melt adhesives.

wherein the functional groups are hydroxyl, carboxyl, or amino;

(iii) at least one diol or a mixture of a diol and a diamine comprising:
(A) at least 15 mol percent, based on the total mol percent of diol moieties or diol and diamine moieties, of a diol or diamine having the formula $H(-OCH_2CH_2-)_nOH$ and $HRN(-(CH_2CH_2O-))_nNHR$ wherein n is 2 to about 20 and R is hydrogen or $C_1$-$C_6$ alkyl, or
(B) about 0.1 to less than about 15 mol percent, based on the total mol percent of diol moieties or diol and diamine moieties, of moieties of a poly(ethylene glycol) having the formula $H(-OCH_2CH_2-)_nOH$ wherein n is 2 to about 500, provided that the mol percent of such moieties is inversely proportional to the value of n; and, (iv) 0 to about 40 mol percent, moieties of a difunctional monomer reactant selected from hydroxycarboxylic acids, aminocarboxylic acids and aminoalkanols; the polymer containing substantially equal mol proportions of acid equivalents (100 mol %) and diol or diol and diamine equivalents (100 mol %) wherein at least 20 weight percent of the groups linking the moieties of the monomeric units are ester linkages and wherein the inherent viscosity is at least 0.1 dL/g measured in a 60/40 parts by weight solution of phenol/tetrachloroethane at 25° C. and at a concentration of about 0.25 g of polymer in 100 ml of the solvent; and (2) about 20 to 80 weight percent of the branched water-dispersible polyester made of the moieties of reaction products;
(a) at least one difunctional dicarboxylic acid which is not a sulfomonomer;
(b) about one to 20 mol percent, based on the total of acid, hydroxyl and amino equivalents, of residues of at least one difunctional sulfomonomer containing at least one sulfonate group bonded to an aromatic ring wherein the functional groups are hydroxyl, carboxyl, or amino;
(c) at least one difunctional reactant selected from a glycol or a mixture of glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;
(d) about 0 to 40 mol % of a difunctional reactant selected from hydroxycarboxylic acids having one —C(R—)$_2$—OH group, aminocarboxylic acids having one —NRH group, amino-alcohols having one —C(R—)$_2$—OH group and one —NRH group, or mixtures of said difunctional reactants wherein R in the reactant is hydrogen or an alkyl group of 1 to 6 carbon atoms; and
(e) 1 to 40 mol % of a multifunctional reactant containing at least three functional groups selected from the group consisting of hydroxyl, carboxyl, amino, and mixtures thereof;

wherein the polyester has a predispersion pH greater than 4 and all stated mol percents are based on the total of all acid, hydroxyl, and amino group containing reactants being equal to 200 mol percent, and wherein the polymer containing a portion of the acid-group containing reactants (100 mol percent acid) to hydroxyl and amino-group containing reactants (100 mol %) wherein the blend of the polyester of (1) and the polyester of (2) has an overall IV of 0.2 dL/g measured in a 60/40 parts by weight solution of phenol/tetrachloroethane at 25° C. and at a concentration of about 0.25 g of polymer blend in 100 ml of the solvent, the ring and ball softening point (RBSP) of the blend is at least 70° C., and the glass transition temperature $T_g$ of the blend is no greater than 20° C.

2. The composition according to claim 1 wherein the concentrations of the two polyesters in the composition are, greater than 30 but less than 80 weight percent polyester of (1) and greater than 20 but less than 70 weight percent of the polyester of (2).

3. The composition according to claim 2 wherein the concentrations of the two polyesters in the composition are, about 60 to 75 weight percent of the polyester of (1) and about 25 to 40 weight percent of the polyester of (2).

4. The composition according to claim 1 wherein the final adhesive composition has a $T_g$ of about 4 to –20° C.

5. The composition according to claim 1 wherein the final adhesive composition has a viscosity of about 1,500 to 30,000 cP at 350° F. (177° C.).

6. The composition according to claim 1 further comprising at least one additional component selected from the group consisting of plasticizers, tackifiers, resins, elastomers, low molecular weight polyolefins, and stabilizers.

* * * * *